Patented Aug. 5, 1924.

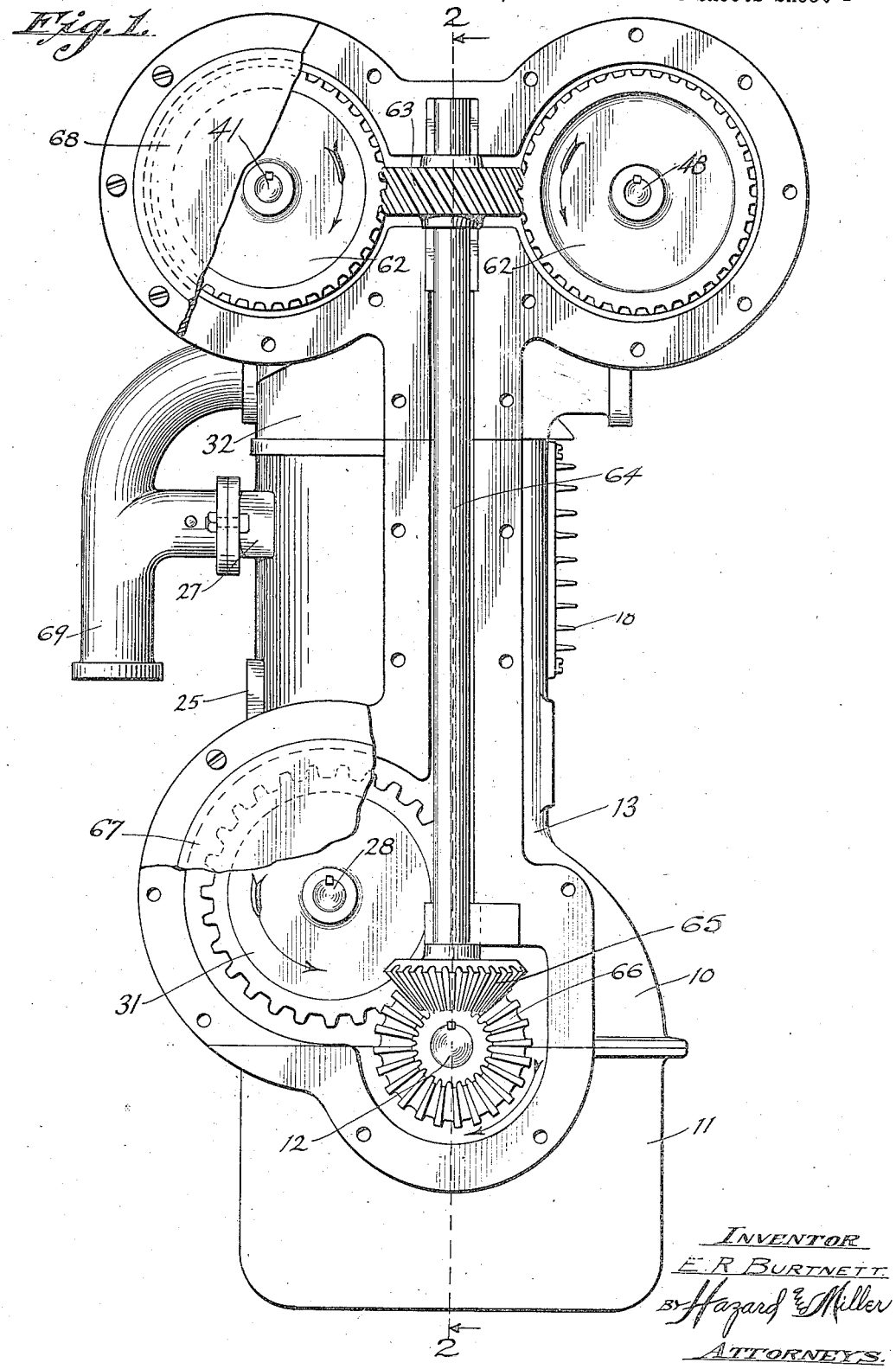

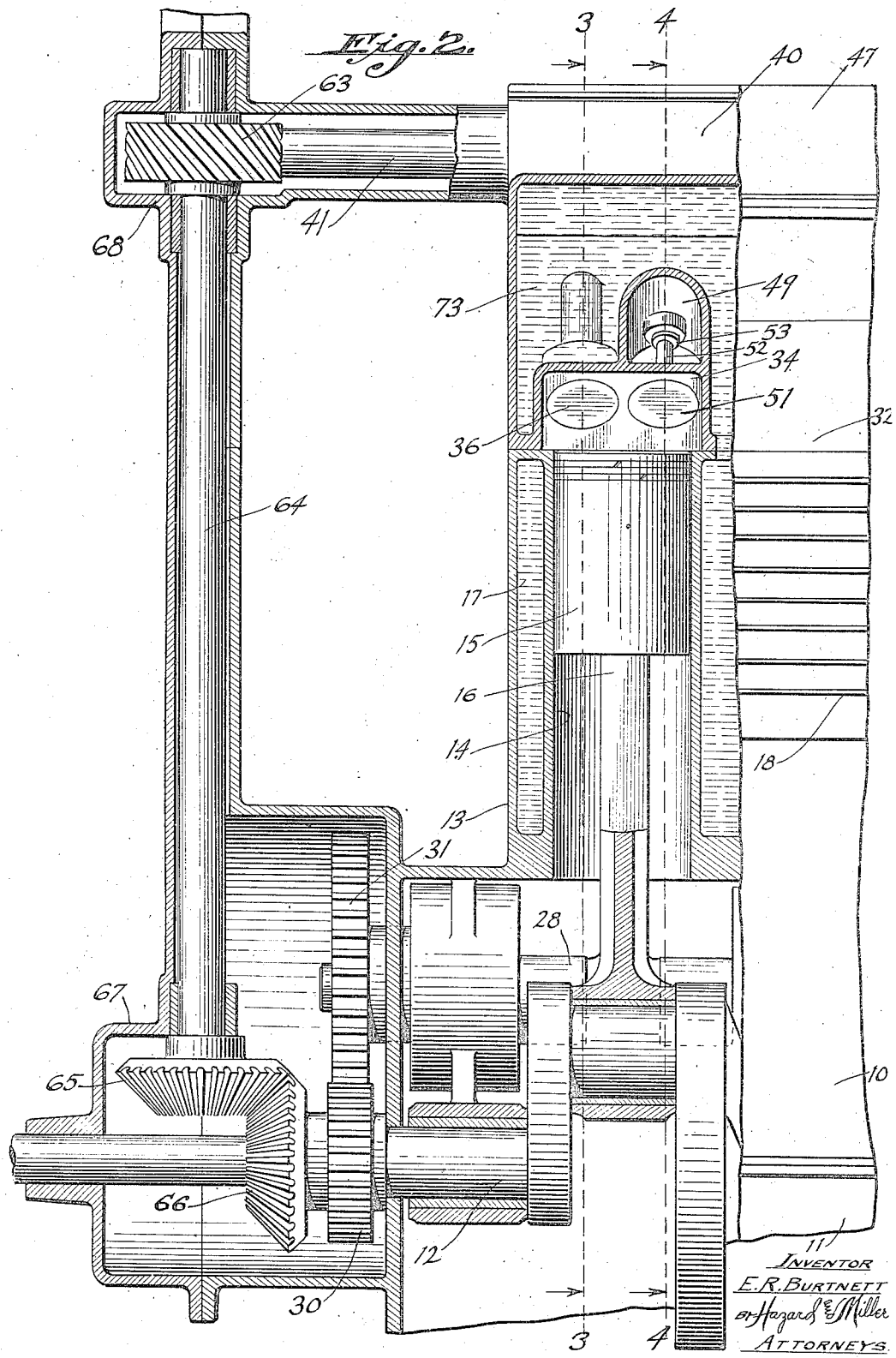

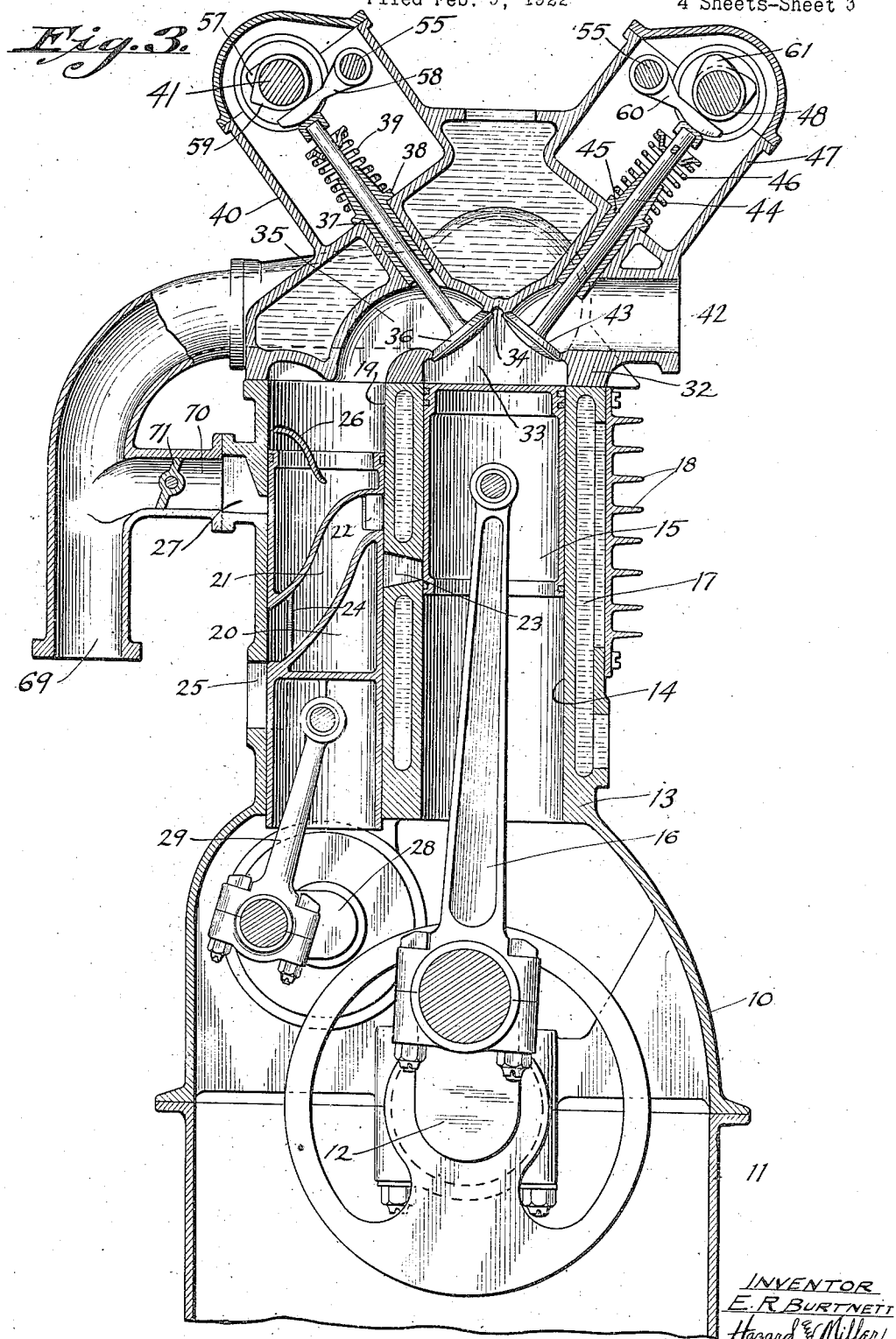

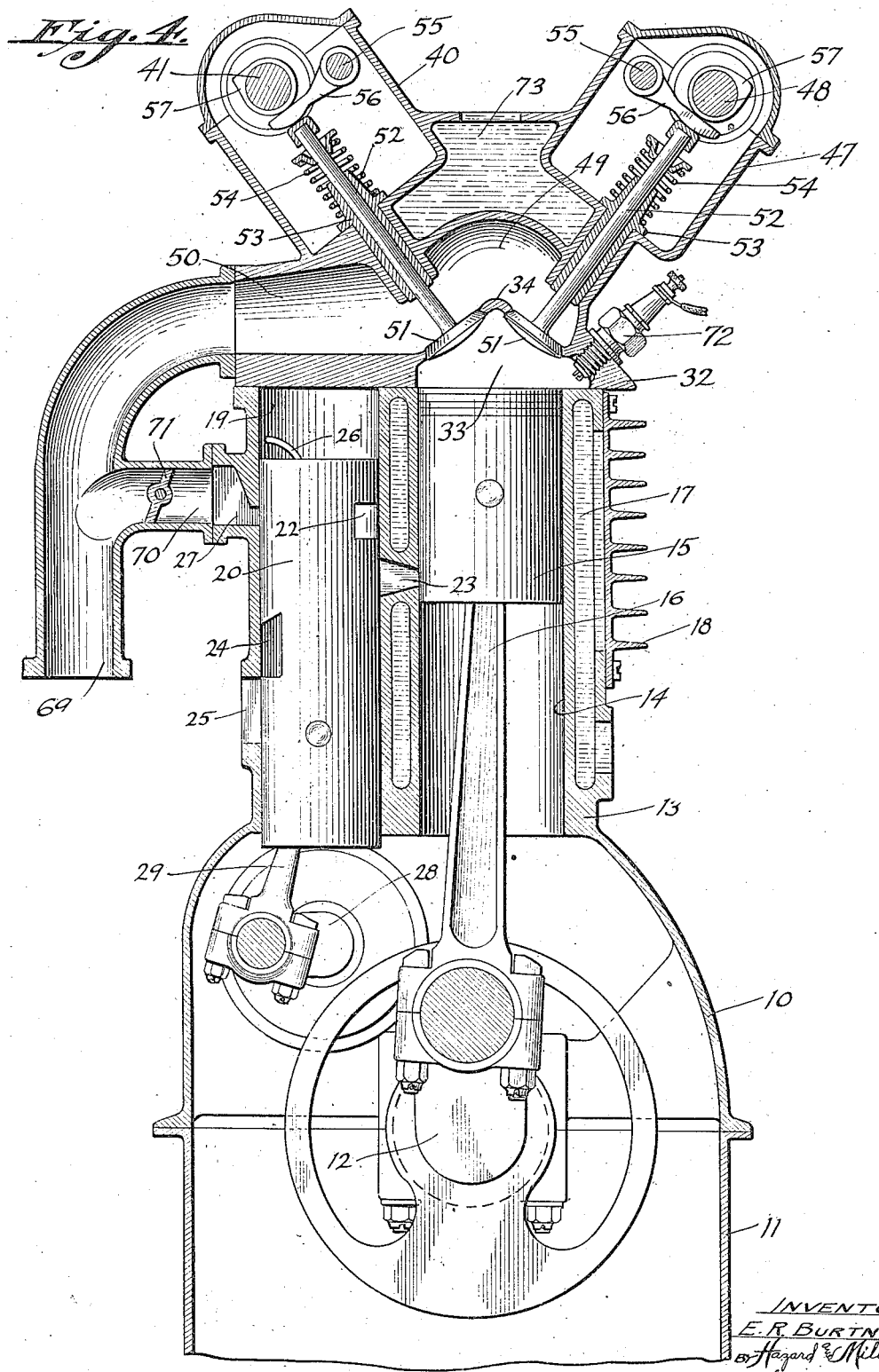

1,504,095

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

SUPERCHARGING AUXILIARY-EXHAUST POPPET-VALVE MOTOR.

Application filed February 9, 1922. Serial No. 535,201.

*To all whom it may concern:*

Be it known that I, EVERETT R. BURTNETT, a citizen of the United States, residing at Los Angeles, in the county of Los Angeles and State of California, have invented new and useful Improvements in Supercharging Auxiliary-Exhaust Poppet-Valve Motors, of which the following is a specification.

My invention relates to an internal combustion engine of the four cycle, poppet valve type, the principal objects of my invention being to generally improve upon and simplify the construction of the existing forms of similar engines, to provide an engine having means whereby a supercharged or precompressed gaseous fuel is forced into the combustion chamber of the engine, thereby materially increasing the volume of gaseous fuel taken into the combustion chamber on each suction stroke, and, further, to provide an engine having an auxiliary exhaust port which is arranged so as to release a considerable portion of the burnt gases and products of combustion at the end of the power stroke of the piston.

The auxiliary exhaust port contemplated by my invention provides means for releasing the internal pressure developed by the combustion of the gaseous fuel charges and, consequently, reduces the temperature developed within the combustion chamber. Further, the exhaust of a considerable volume of the hot gases at the end of the power stroke of the piston necessarily decreases the volume of burnt gases that are expelled on the exhaust stroke of the piston, and as a result it is possible to function the last mentioned operation with one poppet valve instead of two. Thus, if four poppet valves are utilized in the cylinder head, one of said valves is utilized as an exhaust valve, thereby permitting the use of the remaining three valves for the admission of gaseous fuel, two of the fuel inlet valves being open during the full suction stroke of the piston to provide a direct passage through the head of the engine into the combustion chamber thereof, and the remaining fuel inlet valve controlling a by-pass for a precompressed charge of gaseous fuel that is forced into the combustion chamber under pressure from the supercharging chamber. This action materially increases the efficiency of the engine at high speeds and maintains a high initial pressure, which means high compression and normal operation at relatively high engine speeds.

A further object of my invention is to provide the supercharging plunger or piston valve with an exhaust passageway through which the burnt gases and products of combustion pass as they discharge from the lower end of the combustion chamber, and such construction provides for the preheating of the charge of gaseous fuel that is compressed and forced into the combustion chamber by the supercharging plunger.

With the foregoing and other objects in view, my invention consists in the features of construction and combination and arrangement of parts hereinafter more fully described and claimed, reference being had to the accompanying drawings, in which—

Figure 1 is an end elevational view of an engine of my improved construction with parts thereof broken away in order to more clearly illustrate the driving connection from the crank shaft of the engine to the valve operating cam shafts and the supercharging cylinder crank shaft;

Figure 2 is a vertical section taken on the line 2—2 of Figure 1;

Figure 3 is a vertical transverse section taken approximately on the line 3—3 of Figure 2;

Figure 4 is a vertical transverse section taken approximately on the line 4—4 of Figure 2.

Referring by numerals to the accompanying drawings, 10 and 11 designate, respectively, the upper and lower parts of a crank case, the same being preferably formed of cast metal, and the end walls thereof being provided with suitably arranged bearings for a crank shaft 12. Formed integral with or fixed to the upper portion of the upper member 10 of the crank shaft is a cylinder block 13 in which is formed one or more vertically disposed bores such as 14, and the upper portions thereof constitute combustion chambers. Arranged for reciprocatory movement within each bore 14 is a piston 15 that is connected in the usual manner to one of the cranks of shaft 12 by a connecting rod 16. The walls of the cylinder block that are disposed about the bores 14 are provided with chambers 17 through which may be circulated a fluid cooling medium, such as water, and if desired the outer portions of the walls that are disposed about the combustion chambers may be provided with heat radiating fins or flanges such as 18.

Formed in the cylinder block adjacent to each bore 14 and arranged parallel therewith is a bore or chamber 19 that is adapted to receive a supercharging plunger or piston valve. This supercharging plunger comprises a cylinder 20 having formed through its upper portion an inclined or curved duct or passageway 21, the upper inner end thereof terminating in a port 22 that is adapted to communicate with a port 23, which latter is formed through the wall of the cylinder block between the chambers 14 and 19 and in a plane above that occupied by the upper face of cylinder 15 when the latter is at its low center. The lower end of duct 21 communicates with a port 24, and the latter is arranged to communicate with an exhaust port 25 in the outer portion of the wall of the cylinder that surrounds the chamber 19 when the supercharging plunger is at its low center. Carried by the upper end of the piston valve or plunger 20 is a curved or inclined baffle plate 26, a portion of which projects above the upper end of the body of said piston valve or plunger, and which baffle plate is arranged to direct gaseous fuel downwardly onto the wall of the piston valve or plunger that surrounds the exhaust duct or passageway 21. Formed through the upper portion of the wall that is disposed about the chamber 19 is a gaseous fuel inlet port 27 with which the space between the upper end of plunger 20 and the outer upper edge of baffle plate 26 is adapted to coincide when the supercharging plunger is at its low center. The lower portion of the supercharging plunger 20 is connected to a crank on a shaft 28 by a connecting rod 29, and said shaft 28 is journaled in suitable bearings within the upper part 10 of the crank case. Crank shaft 28 is driven at half the speed of crank shaft 12 in any suitable manner, preferably by means of a relatively small pinion 30 that is secured on crank shaft 12, and which meshes with a larger pinion 31 that is fixed on crank shaft 28.

Fixed on top of the cylinder block 13 is a head block 32 and formed in the under side thereof and communicating with the upper end of the combustion chamber 14 is a recess or pocket 33. A substantially inverted V-shaped partition 34 is disposed immediately above this recess or pocket, and formed in said partition are four openings that are provided with seats for inwardly opening valves. Leading from one of these openings through the head 32 and communicating with the adjacent supercharging chamber 19 is a duct 35 through which latter the compressed charges of gaseous fuel are forced under pressure into the combustion chamber by the piston valve or supercharging plunger 20. The opening from passageway 35 into the recess or pocket 33 is controlled by a valve 36 that is carried by the lower end of a stem 37, the latter extending upwardly and outwardly through an inclined bearing 38 that is arranged in the head above the duct 35, and associated with said valve stem is a spring 39 that tends to normally retain the valve 36 upon its seat. The upper end of valve stem 37 terminates within the chamber of a cam shaft housing 40, which latter is formed in the upper portion of head 32 and provided with suitably arranged bearings for a cam shaft 41. The opening directly opposite to the opening that is closed by valve 36 communicates with an exhaust duct or passageway 42 that leads outwardly through head 32, and this last mentioned opening is normally closed by a valve 43 which is carried by the lower end of a stem 44. This stem is arranged for operation through an inclined bearing 45, and associated with said stem is a spring 46 that normally maintains the valve 43 upon its seat. The upper end of valve stem 44 terminates in a chamber within a housing 47, the latter being provided with suitable bearings for a cam shaft 48.

The pair of openings to the side of the openings that are controlled by valves 36 and 43 communicate with the inverted U-shaped end portion 49 of a gaseous fuel inlet duct or passageway 50 that is formed through head 32, and said openings are provided with valve seats upon which normally rest fuel inlet valves 51. These valves are carried by the lower ends of stems 52 that are arranged for sliding movement through inclined bearings 53 in the upper portion of head 32, and said valve stems have associated therewith springs 54 then normally retain the valves 51 upon their seats. The upper portion of one of the stems 52 terminates within the chamber in housing 40, while the upper portion of the other stem terminates in the chamber within housing 47. Supported in suitable bearings within the housings 40 and 47 are rods 55 upon which are loosely mounted arms or fingers 56 that bear on the upper ends of the inlet valve stems 52. Secured on the cam shafts 41 and 48 are cams 57 that bear directly on top of the free ends of the arms 56, the high portions of which cams are adapted to depress the free ends of said arms 56, consequently imparting downward and opening movement to the inlet valve stems 52.

Loosely mounted on rod 55 in the chamber within housing 40 is an arm 58, the free end of which bears on the upper end of valve stem 37, and carried by shaft 41 is a cam 59 that bears on said arm 58. Loosely arranged on rod 55 within the chamber in housing 47 is a short arm 60, the free end of which bears on top of exhaust valve rod 44 and bearing on top of said arm 60 is the periphery of a cam 61 that is carried by shaft 48. The means for imparting simultaneous and corresponding rotary motion to the cam shafts 41 and 48 includes worm wheels 62 that are fixed on the ends of said cam shafts, and which worm wheels are engaged by an intermediate worm wheel 63 that is carried by the upper portion of a shaft 64, the lower end of the latter carrying a beveled pinion 65 that meshes with a corresponding pinion 66 that is fixed on crank shaft 12. The pinions 30 and 31 and beveled pinions 65 and 66 are contained within a suitable housing 67 on the end of the crank case of the engine, and the worm wheels 62 and 63 are contained within a suitable housing 68 that projects from the upper portion of the engine head 32.

A gaseous fuel inlet pipe 69 leads to the outer end of duct 50, and leading from said supply pipe to the gaseous fuel inlet port 27 is a branch pipe 70 in which latter is arranged for operation a suitable throttle valve 71, which may be actuated in any suitable manner, preferably by means of a pull rod and crank shaft. Pipe 69 may be connected to a suitable source of gaseous fuel supply, for instance, a carbureter.

Located at a suitable point in head 32 is a spark plug 72 that is connected in the usual manner to the ignition system associated with the engines, and the terminals of the electrodes of said plug are positioned within pocket or recess 32. The head 32 is provided with relatively large chambers or pockets 73, through which may be circulated a fluid cooling medium, such as water, said chambers being arranged so that they practically enclose the greater portions of the recess 33, ducts 35, 42, 49 and 50.

The operation of my improved engine is as follows: With the various parts of the engine in the positions illustrated in Figures 2, 3 and 4, the crank shaft 12 is at its high center, with the piston 15 at its upper limit of movement, and the supercharging plunger 20 is at the half-way point on its downward stroke. As crank shaft 12 passes its high center or immediately thereafter the compressed charge of gaseous fuel within pocket or recess 33 will be ignited by a spark produced between the terminals of the electrodes of spark plug 72 and the power developed by the ignited charge will force the piston 15 downward on its power stroke. At the same time, piston valve or plunger 20 is moving downward at half the speed of the piston, so that just before the piston 15 reaches the lower end of its downward stroke, port 22 registers with exhaust port 23, thereby permitting the exhaust of the greater portion of the burnt gases and products of combustion from the combustion chamber through registering ports 23 and 22, through exhaust duct 21, and thence through exhaust port 25. On the succeeding upward or exhaust stroke of piston 15, exhaust valve 43 is opened as a result of the engagement of the high portion of cam 61 with arm 60, and while said exhaust valve is open the remaining burnt gases and products of combustion within the combustion chamber will be forced therefrom outwardly through exhaust passageway 42. As the piston passes its high center and starts downwardly on its succeeding suction stroke, cams 57 swing the free ends of arms 56 downwardly, thereby moving inlet valve rods 52 downwardly so as to unseat the inlet valves 51, and a charge of gaseous fuel will be drawn through pipe 69, duct 50 and past the open inlet valves into the combustion chamber, which charge of gaseous fuel will be relatively large in volume, due to the relatively large inlet passageway, and the relatively large area of the gaseous inlet ports that are controlled by valves 51. As the piston passes its low center and starts upward on its succeeding compression stroke, the high portions of cams 57 ride off the arms 56, thereby permitting the inlet valves 51 to close, and as the piston moves upward in chamber 14 the gaseous fuel charge will be compressed in the pocket or recess 33, that forms the upper portion of the combustion chamber. This completes the cycle of operations of the engine, and as the piston passes its high center the compressed gaseous fuel charge will be ignited by the spark produced between the electrodes of the spark plug. In order to accelerate the power and speed of the engine, for instance, in effecting a quick start or when ascending steep grades or hauling relatively heavy loads, valve 71, which is manually controlled, may be partially or fully opened as requirements demand, and when supercharging plunger 20 reaches its lower limit of movement gaseous fuel will pass from pipe 69 through branch pipe 70, thence through inlet port 27, and striking against the curved deflector 26, this charge of gaseous fuel will be deflected downwardly directly onto the housing that encloses exhaust duct 21. Inasmuch as this housing is highly heated by the burnt gases and products of combustion passing through it, this additional supply of gaseous fuel will be preheated when delivered into the upper portion of the supercharging plunger, and on the succeeding upward stroke of the plunger or piston valve this gaseous fuel will be precompressed in the upper portion of chamber 19 and duct 25, and during the downward suction stroke of piston 15 the auxiliary fuel inlet valve 36 will be opened by the high portion of cam 59 acting upon arm 58 so that the precompressed and heated gaseous fuel charge will be forced under pressure into the combustion chamber simultaneously with the gaseous fuel that enters said combustion chamber past the open inlet ports 51 as previously described.

Thus the combustion chamber is supercharged with gaseous fuel, which action, as herein stated, occurs when it is desired to materially increase the power and speed of the engine. Thus it will be seen that I have provided an engine having four valve controlled openings in its head, the adjacent members of a pair of said valves on one side being utilized for controlling the normal inlet of gaseous fuel into the combustion chamber, one of the valves on the other side being utilized for controlling a supercharge of precompressed gaseous fuel into the combustion chamber and the fourth valve being utilized for controlling that portion of the exhaust that remains in the combustion chamber after the greater portion of the exhaust pressure has discharged through the exhaust port in the cylinder wall that is uncovered when the piston is at its lower limit of movement. By providing the engine with a pair of fuel inlet ports and with an inlet port for a supercharge of gaseous fuel, it is possible to develop a wide range of power and speed with relatively small piston displacement, consequently increasing the efficiency of the engine and particularly while the same is operating at abnormal speeds and under abnormal loads.

It will be understood that minor changes in the size, form and construction of the various parts of my improved engine may be made and substituted for those herein shown and described without departing from the spirit of my invention, the scope of which is set forth in the appended claims.

I claim as my invention:

1. An internal combustion engine having a combustion chamber, a head therefor, said head being provided with a pair of fuel inlet ports, a compressed fuel inlet port and an exhaust port, valves normally closing said ports, a piston arranged for operation within the combustion chamber, means for actuating said valves in proper time relation to each other and to the movements of the piston within the said combustion chamber, there being an exhaust port formed through the wall of the combustion chamber in a plane above the plane occupied by the top of the piston when the latter is at its lower limit of movement, and a piston valve for controlling said last mentioned exhaust port and for compressing gaseous fuel and forcing the same through said compressed fuel inlet port.

2. An internal combustion engine having a combustion chamber, a head therefor, said head being provided with a pair of fuel inlet ports, a compressed fuel inlet port and an exhaust port, valves normally closing said ports, a piston arranged for operation within the combustion chamber, means for actuating said valves in proper time relation to each other and to the movements of the piston within the said combustion chamber, there being an exhaust port formed through the wall of the combustion chamber in a plane above the plane occupied by the top of the piston when the latter is at its lower limit of movement, a piston valve for controlling said last mentioned exhaust port and for compressing gaseous fuel and forcing the same through said compressed fuel inlet port, and means for operating said piston valve in proper time relation to the movements of the piston and the compressed fuel inlet control valve.

3. In an internal combustion engine, a combustion chamber having a pair of valve controlled fuel inlet openings, a valve controlled compressed fuel inlet opening, a valve controlled exhaust opening, there being an exhaust opening leading from the lower portion of said combustion chamber, and a piston valve controlling said last mentioned exhaust opening and which piston valve is utilized for compressing gaseous fuel and forcing the same through the compressed fuel inlet opening that leads into the combustion chamber.

4. An internal combustion engine having a combustion chamber and a piston valve chamber, there being an exhaust port leading from the lower portion of the combustion chamber into said piston valve chamber, there being inlet and exhaust ports formed through the wall that surrounds the piston valve chamber, and a piston valve arranged for operation within said piston valve chamber, which piston valve is provided with an exhaust passageway that is adapted to communicate with the exhaust ports that lead to and from the piston valve chamber.

5. An internal combustion engine having a combustion chamber and a piston valve chamber, there being an exhaust port leading from the lower portion of the combustion chamber into said piston valve chamber, there being inlet and exhaust ports formed through the wall that surrounds the piston valve chamber, a piston valve arranged for operation within said piston valve chamber, which piston valve is provided with an exhaust passageway that is adapted to communicate with the exhaust ports that lead to and from the piston valve chamber, and there being a valve controlled passageway leading from the upper portion of the piston valve chamber to said combustion chamber.

6. An internal combustion engine, having a combustion chamber and a piston valve chamber, there being a valve controlled passageway between the upper portions of said chambers, there being an exhaust port leading from the lower portion of the combustion chamber into the intermediate portion of the piston valve chamber, there being inlet and exhaust ports formed through the wall of the piston valve chamber, a piston valve arranged for reciprocatory movement within the piston valve chamber, there being an exhaust passageway formed through said piston valve and which is adapted to communicate with the exhaust ports that lead into and from the piston valve chamber, and a deflector carried by the upper portion of the piston valve and which is adapted to deflect gaseous fuel that enters the fuel inlet port downwardly into the interior of said piston valve.

7. An internal combustion engine having a combustion chamber and a piston valve chamber, there being a valve controlled passageway connecting the upper portions of said chambers, a piston valve arranged for reciprocatory movement within the piston valve chamber for controlling a part of the exhaust from the combustion chamber and compressing gaseous fuel, and forcing the same into the combustion chamber, there being a pair of valve controlled fuel inlet openings communicating with the upper portion of the combustion chamber, and there being a valve controlled exhaust opening at the upper end of said combustion chamber.

8. An internal combustion engine having a combustion chamber, a head therefor, said head being provided with a pair of fuel inlet ports, a compressed fuel inlet port and an exhaust port, valves normally closing said ports, a piston arranged for operation within the combustion chamber, means for actuating said valves in proper time relation to each other and to the movements of the piston within the said combustion chamber, there being an exhaust port formed through the wall of the combustion chamber in a plane above the plane occupied by the top of the piston when the latter is at its lower limit of movement, and means for controlling said last mentioned exhaust port and for compressing gaseous fuel and forcing the same through said compressed fuel inlet port.

9. An internal combustion engine, having a combustion chamber and a piston valve chamber, there being a valve controlled passageway between the upper portions of said chambers, there being an exhaust port leading from the lower portion of the combustion chamber into the intermediate portion of the piston valve chamber, there being inlet and exhaust ports formed through the wall of the piston valve chamber, a piston valve arranged for reciprocatory movement within the piston valve chamber, there being an exhaust passageway formed through said piston valve and which is adapted to communicate with the exhaust ports that lead into and from the piston valve chamber, and means for directing the gaseous fuel entering the piston valve chamber interiorly of the piston valve.

In testimony whereof I have signed my name to this specification.

EVERETT R. BURTNETT.